United States Patent [11] 3,558,929

[72] Inventor Richard B. Robrock, II
Matawan Township, Monmouth County, N.J.
[21] Appl. No. 732,385
[22] Filed May 27, 1968
[45] Patented Jan. 26, 1971
[73] Assignee Bell Telephone Laboratories, Incorporated
Murray Hill, N.J.
a corporation of New York

[54] BIPOLAR PULSE REGENERATOR
2 Claims, 3 Drawing Figs.

[52] U.S. Cl. .......... 307/268, 307/206, 307/218, 307/322, 307/286, 317/234; 330/34
[51] Int. Cl. .......... H03k 19/08
[50] Field of Search .......... 317/234/10; 331/107G, 206; 307/205, 258, 322, 299; 330/341

[56] References Cited
UNITED STATES PATENTS

| | | | |
|---|---|---|---|
| 3,365,583 | 1/1968 | Gunn.......... | 307/205 |
| 3,452,221 | 6/1969 | Gunn.......... | 307/299 |

*Primary Examiner*—Donald D. Forrer
*Assistant Examiner*—B. P. Davis
*Attorneys*—R. J. Guenther and E. W. Adams, Jr.

ABSTRACT: A pair of two-valley, bulk semiconductor devices is connected in series across a DC voltage source such that each of them is biased above the domain sustaining potential but below the oscillation sustaining potential. Input pulses are applied to the common junction of the two devices with a negative pulse causing domain nucleation in a first while the second remains in the ohmic state. Positive input pulses cause domain nucleation in the second device, while the first remains in the ohmic state. Since the creation of a high-field domain effects a sharp reduction in device current, the voltage at the common junction is a pulse output signal with a positive pulse being generated in response to a positive input trigger and a negative pulse being generated in response to a negative input trigger. The width of each pulse is specified by the transit time of the domain.

INVENTOR
R. B. ROBROCK II
BY [signature]
ATTORNEY

BIPOLAR PULSE REGENERATOR

BACKGROUND OF THE INVENTION

This invention relates to circuit arrangements which employ as the active device any bulk semiconductor which exhibits the phenomenon of domain nucleation and propagation. The mechanism for this observed phenomenon is believed to result from the carriers in such materials exhibiting negative incremental mobility over a range of applied electric field. The source of this negative incremental mobility is vastly different from one material to the next. In gold-doped Ge it may be attributed to a field dependent trapping effect, in CdS to phonon-electron interaction, while in GaAs, InP, CdTe, ZnSe and others it is believed to be the result of an intervalley scattering mechanism. The basic theory of these devices is set forth in detail in a series of papers in the Jan. 1966 IEEE, Transactions on Electron Devices, Volume ED—13, No. 1, and Sept. 1967 IEEE, Transactions on Electron Devices, Volume ED—14, No. 9.

As set forth in the papers mentioned above, when an increasing voltage is applied to opposite ends of a suitable sample of a bulk semiconductor, such as *n*- type gallium arsenide, the average current in the sample increases almost linearly with voltage until a critical value is reached at which point the current drops sharply to a fraction of its maximum value. Above this critical voltage the average current in the sample remains essentially constant. In addition, in this range of reduced current the instantaneous waveform is found to oscillate periodically at a frequency related to the sample length. The critical voltage at which the drop in current in the sample takes place and at which oscillations are initiated is termed the threshold voltage, $V_T$.

Present theory holds that these oscillations result from domain nucleations near the negative electrode (cathode) which travel toward the positive electrode (anode). It has been found that after a domain has been nucleated, the domain grows to a stable shape and continues to drift towards the positive electrode even if the applied voltage is lowered as long as this voltage remains above a minimum value termed the domain sustaining voltage, $V_{DS}$. If the applied voltage exceeds a value known as the oscillation sustaining voltage, $V_{OS}$, then the arrival of a domain at the anode results in the nucleation of a new domain near the cathode. The continued nucleation, propagation, and dissolution of domains produces coherent oscillations in the current waveform. If the applied voltage, however, is less than $V_{OS}$, then the dissolution of a domain at the anode returns the device to its original ohmic state.

SUMMARY OF THE INVENTION

In accordance with a preferred embodiment of the present invention, a pair of two-valley, bulk semiconductor devices is connected in series across a DC voltage source such that each of them is biased above the domain sustaining potential but below the oscillation sustaining potential. Input pulses are applied to the common junction of the two devices with a negative pulse causing domain nucleation in a first while the second remains in the ohmic state. Positive input pulses cause domain nucleation in the second device, while the first remains in the ohmic state. Since the creation of a high-field domain effects a sharp reduction in device current, the voltage at the common junction is a pulse output signal with a positive pulse being generated in response to a positive input trigger and a negative pulse being generated in response to a negative input trigger. The width of this pulse is specified by the transit time of the domain.

BRIEF DESCRIPTION OF THE DRAWINGS

The invention will be more fully comprehended from the following detailed description taken in junction with the drawings in which.

DETAILED DESCRIPTION

Figure 1:
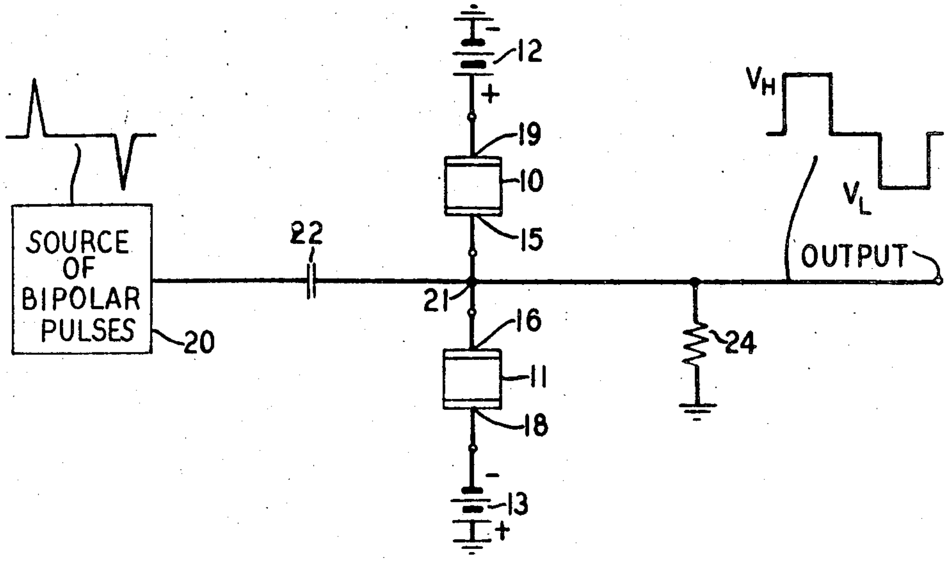
FIG. 1 is a schematic diagram of a bipolar pulse generator embodying the invention.

FIG. 1 shows in schematic diagram from the basic elements of a bipolar amplifier in accordance with the invention. A pair of substantially identical bulk semiconductor devices 10 and 11 are connected in series between a source 12 of positive voltage and a source 13 of negative voltage. Each of the two-valley semiconductor devices has an anode and a cathode and the cathode 15 of device 10 is directly connected to the anode 16 of device 11. The cathode 18 of device 11 is directly connected to negative voltage source 13 and similarly, the anode 19 of device 10 is directly connected to source 12 of positive voltage. The voltage bias $V_B$ provided by sources 11 and 12 is arranged to provide a bias voltage $V_B$ across each device greater than the domain sustaining voltage $V_{DS}$, but less than either the oscillation sustaining voltage $V_{OS}$ or threshold voltage $V_T$. Thus, when a short input trigger pulse causes one or the other of the bulk semiconductor devices to nucleate a domain, that domain will persist until it reaches the positive contact, or anode, whereupon the device returns to the ohmic state.

Figure 2A:
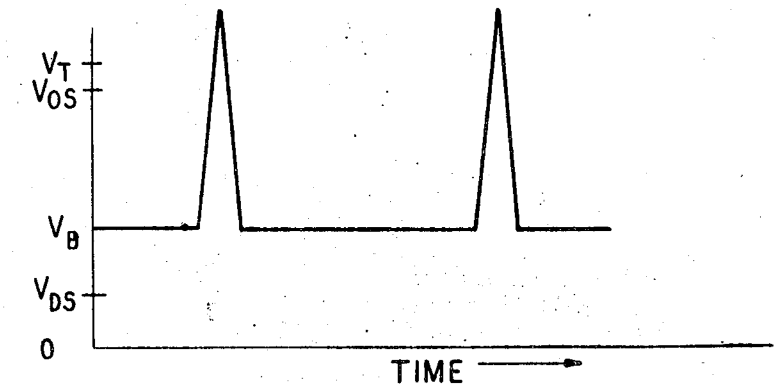
FIGS. 2A through 2B are waveforms helpful to an understanding of the operation of the pulse generator in FIG. 1.
Figure 2B:
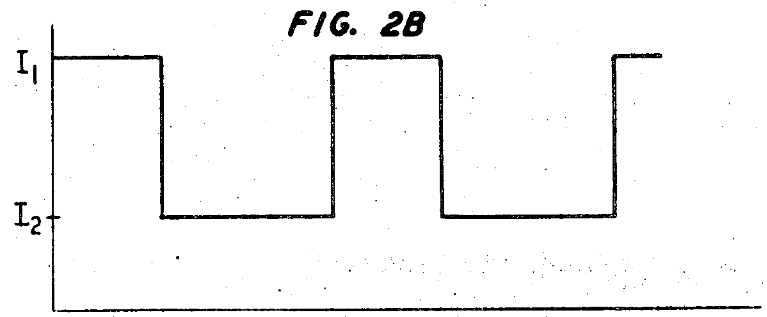

A source of bipolar pulses 20 is connected to the common junction 21 of cathode 15 and anode 16 by means of a coupling capacitor 22. The effect of the voltage applied to a bulk device is illustrated graphically in FIGS. 2A and 2B with the voltage references shown being those previously described. If one considers a single bulk device imbedded in a resistive bias network where the source voltage is illustrated in FIG. 2A, domain nucleation ensures whenever the applied voltage exceeds the threshold $V_T$. The device current then switches from a current $I_1$ in the ohmic state to the current $I_2$ as shown in FIG. 2B where it remains for a period determined by the transit time of the domain. The absorption of the domain by the anode contact then returns the device to the ohmic state at a current level $I_1$ The introduction of the positive pulses from source 20 causes domain nucleation in device 11 which substantially reduces the current flowing through device 11. At the same time, device 10 is unaffected and remains biased in the ohmic region so that it has the characteristics of a resistor. Since the current in the series circuit from source 12 to source 13 is reduced as a result of domain nucleation in device 11, there is less voltage drop in device 10. As a result the output voltage taken across a resistor 24 connected between terminal 21 and ground rises to a level $V_H$ as shown in FIG. 1 and remains at this level during the transit time of the domain from the cathode 18 in device 11 to its anode 16.

In a similar manner, a negative input pulse causes device 10 to nucleate a domain at its cathode 15 so that the current in device 10 is substantially reduced while device 11 is maintained in the ohmic state. Since the series current in the path from source 12 to source 13 is reduced as a result of the nucleation of a domain in device 10 while device 11 is in its ohmic state, the voltage at the output terminal drops to a level $V_L$, shown in FIG. 1, at which level it is maintained during the transit domain from cathode 15 to anode 19.

Thus, in accordance with this invention a bipolar regenerator is realized using only two appropriate bulk semiconductor devices in a relatively simple circuit which is capable of operating at extremely high speeds.

Various embodiments and modifications other than those described herein may be made by those skilled in the art without departing from the spirit and scope of the invention.

For example, sources 12 and 13 which supply DC bias to the circuit may be replaced with controlled sources so as to permit an AND gating operation to be performed on the bipolar input. A regenerated output will only be obtained when the controlled bias voltages exceed the domain sustaining voltages of the bulk devices. In addition, it should be apparent to those skilled in the art that in the pulse regenerator embodying this invention shown in FIG. 1 the length of the two devices 10 and 11 may be different so that the width of the positive output pulses is different from the width of the negative output pulses.

I claim:

1. A circuit arrangement for regenerating a bipolar pulse train which has become distorted in transmission to provide a pulse train relatively free of distortion comprising:
- a pair of bulk semiconductor devices each having an anode and a cathode;
- a direct connection between the cathode of a first of said devices and the anode of a second of said devices;
- means for applying the bipolar pulse signal to be regenerated to said cathode of said first device and said anode of said second device;
- means providing a bias voltage of magnitude greater than the domain sustaining voltage and less than the oscillation sustaining voltage of each of said devices whereby said first device is excited to nucleate a domain when a negative pulse is to be regenerated and said second device is excited to nucleate a domain when a positive pulse is to be regenerated; and
- means for deriving for utilization the regenerated pulse train.

2. A circuit arrangement for regenerating a bipolar pulse train which has become distorted in transmission to provide a pulse train relatively free of distortion comprising:
- a pair of bulk semiconductor devices each having an anode and a cathode and each capable of nucleating a domain from its cathode when the anode-cathode voltage exceeds a predetermined threshold level;
- a direct connection between the cathode of a first of said devices and the anode of a second of said devices;
- means for applying the bipolar pulse signal to be regenerated to said cathode of said first device and said anode of said second device,
- means providing a bias voltage across the anode of said first device and the cathode of said second device of magnitude greater than the sum of the domain sustaining potentials but less than the sum of the oscillation sustaining potentials such that in the absence of bipolar pulse signals each of said devices is biased in the ohmic state, said bias voltage being of predetermined relationship to the amplitude of said bipolar pulses so that said first device is excited to nucleate a domain when a negative pulse is to be regenerated and said second device is excited to nucleate a domain when a positive pulse is to regenerated, and
- means for deriving for utilization the regenerated pulse train.